(12) United States Patent
Kim et al.

(10) Patent No.: US 9,110,300 B2
(45) Date of Patent: *Aug. 18, 2015

(54) DISPLAY APPARATUS AND METHOD OF DRIVING THE SAME

(75) Inventors: Jung-Won Kim, Seoul (KR); Junpyo Lee, Asan-si (KR); Seonki Kim, Anyang-si (KR); Kang-Min Kim, Seoul (KR)

(73) Assignee: SAMSUNG DISPLAY CO., LTD. (KR)

( * ) Notice: Subject to any disclaimer, the term of this patent is extended or adjusted under 35 U.S.C. 154(b) by 585 days.

This patent is subject to a terminal disclaimer.

(21) Appl. No.: 13/297,178

(22) Filed: Nov. 15, 2011

(65) Prior Publication Data

US 2012/0120067 A1 May 17, 2012

(30) Foreign Application Priority Data

Nov. 17, 2010 (KR) ........................ 10-2010-0114551

(51) Int. Cl.
*G06T 15/00* (2011.01)
*G02B 27/22* (2006.01)
(Continued)

(52) U.S. Cl.
CPC .......... *G02B 27/2264* (2013.01); *G09G 3/3648* (2013.01); *G09G 3/3688* (2013.01); *H04N 13/0438* (2013.01); *G09G 3/3614* (2013.01); *G09G 2310/061* (2013.01); *G09G 2310/08* (2013.01); *G09G 2320/0209* (2013.01); *G09G 2320/0252* (2013.01); *G09G 2320/0257* (2013.01); *G09G 2320/0276* (2013.01); *G09G 2340/0435* (2013.01); *G09G 2340/16* (2013.01)

(58) Field of Classification Search
CPC ............. G02B 27/2264; G09G 3/3614; G09G 3/3648; G09G 3/3688; G09G 2310/061; G09G 2310/08; G09G 2320/0209; G09G 2320/0252; G09G 2320/0257; G09G 2320/0276; G09G 2340/0435; G09G 2340/16; H04N 13/0438
USPC ............ 348/46, 43, 51, 53, 790; 345/419, 88, 345/89, 691

See application file for complete search history.

(56) References Cited

U.S. PATENT DOCUMENTS

2006/0012593 A1 1/2006 Iriguchi et al.
2007/0236439 A1* 10/2007 Chen et al. ...................... 345/89
(Continued)

FOREIGN PATENT DOCUMENTS

JP 2004-165713 A 6/2004
JP 2008-242144 A 10/2008
(Continued)

*Primary Examiner* — Christopher S Kelley
*Assistant Examiner* — Zhihan Zhou
(74) *Attorney, Agent, or Firm* — Innovation Counsel LLP

(57) ABSTRACT

In a display apparatus, a frame rate converter divides an image signal into a first image frame for a left eye and a second image frame for a right eye, and generates a first intermediate image frame and a second intermediate image frame. A timing controller converts the first and second image frames to a first compensation frame and a second compensation frame, respectively, and sequentially provides the first compensation frame, the first intermediate image frame, the second compensation frame, and the second intermediate image frame to a data driver. The data driver converts the first and second compensation frames to left-eye and right-eye data voltages, respectively, and converts the first and second intermediate image frames to a predetermined black data voltage.

17 Claims, 10 Drawing Sheets

(51) Int. Cl.
*H04N 13/04* (2006.01)
*G09G 3/36* (2006.01)

(56) References Cited

U.S. PATENT DOCUMENTS

2007/0285349 A1* 12/2007 Hong et al. .................. 345/38
2008/0291326 A1* 11/2008 Shishido et al. ............. 348/555
2010/0033555 A1* 2/2010 Nagase et al. ............... 348/43
2010/0238274 A1* 9/2010 Kim et al. .................... 348/51
2011/0187705 A1* 8/2011 Lan et al. ..................... 345/419
2011/0304658 A1* 12/2011 Park et al. .................... 345/691

FOREIGN PATENT DOCUMENTS

JP  2009-075392 A        4/2009
WO  WO 2010058954 A2 *  5/2010

* cited by examiner

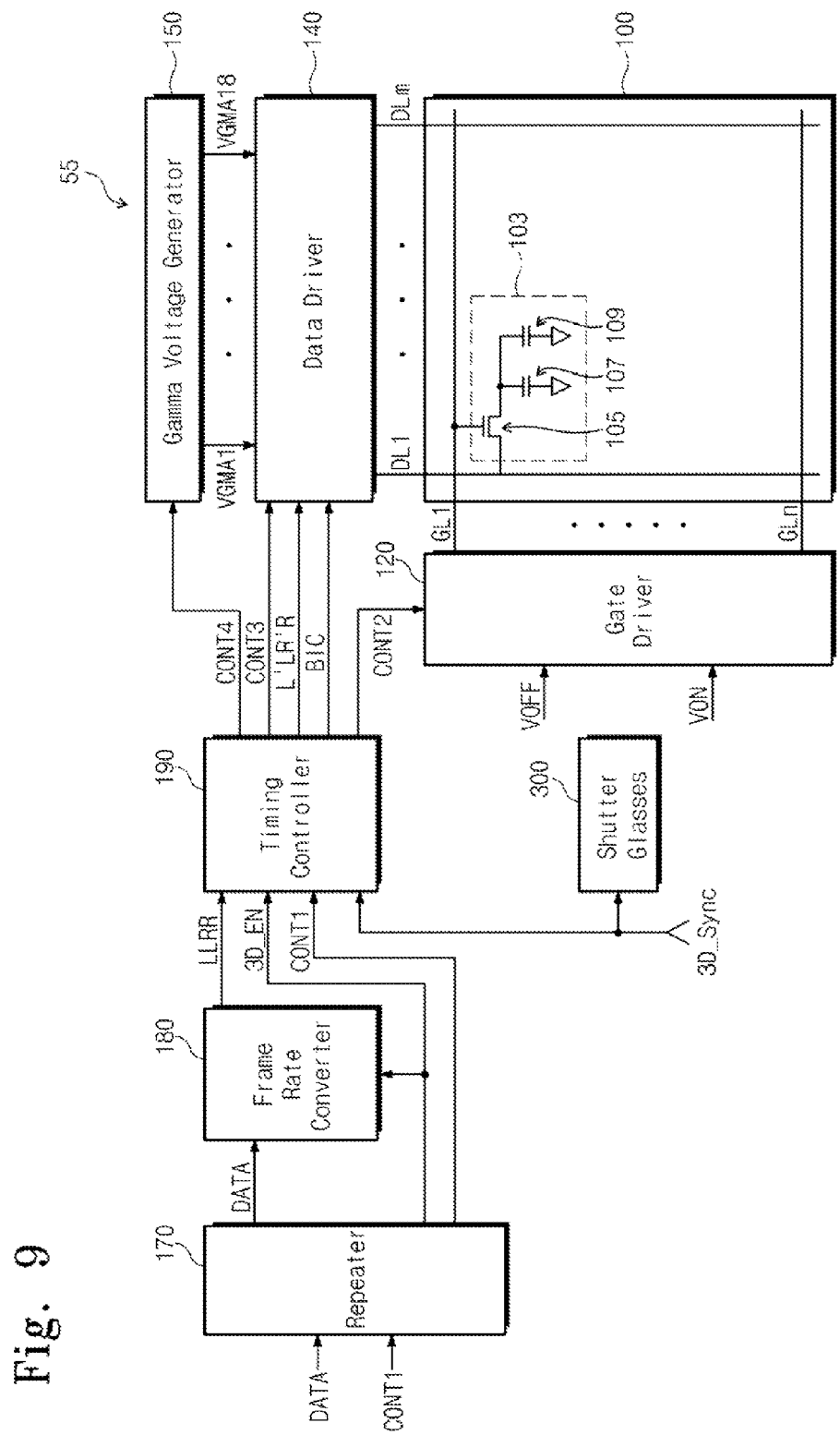

DISPLAY APPARATUS AND METHOD OF DRIVING THE SAME

CROSS-REFERENCE TO RELATED APPLICATION

This application claims priority to, and the benefit of, Korean Patent Application No. 10-2010-0114551 filed on Nov. 17, 2010, the contents of which are herein incorporated by reference in its entirety.

BACKGROUND

1. Field of Disclosure

Embodiments of the present invention relate to flat panel displays. More particularly, embodiments of the present invention relate to a display apparatus capable of improving a display quality, and methods of driving the display apparatus.

2. Description of the Related Art

A three-dimensional image display apparatus presents two two-dimensional images, i.e., a left-eye image and a right-eye image, to be respectively viewed by left and right eyes of the observer. The two images have a binocular disparity, so that the user feels a three-dimensional effect when viewing them.

A typical three-dimensional image display apparatus displays a three-dimensional image by alternately displaying the left-eye image and the right-eye image on its display panel. When the image displayed on the display panel is changed from the left-eye image to the right-eye image or vice versa, the left-eye image and the right-eye image are mixed with each other for a certain period of time, due to the fact that display panels cannot instantaneously switch between images. This mixing can cause deterioration in display quality.

SUMMARY

Exemplary embodiments of the present invention provide a display apparatus capable of removing an afterimage, to improve image quality.

Exemplary embodiments of the present invention also provide a method of driving the display apparatus.

According to the exemplary embodiments of the present invention, a display apparatus includes a frame rate converter, a timing controller, a data driver, and a display panel.

The frame rate converter divides an image signal into a first image frame for a left eye and a second image frame for a right eye and generates a first intermediate image frame and a second intermediate image frame, which are successive to the first image frame and the second image frame, respectively, so as to convert the image signal to a quad-speed image signal. The timing controller generates a first compensation frame and a second compensation frame from the first image frame and the second image frame respectively, to sequentially output the first compensation frame, the first intermediate image frame, the second compensation frame, and the second intermediate image frame. The data driver converts the first compensation frame and the second compensation frame from the timing controller to a left-eye data voltage and a right-eye data voltage, respectively, converts the first and second intermediate image frames to a black data voltage corresponding to a predetermined black gray-scale in response to a black insertion control signal, and inverts a polarity of the left-eye data voltage and the right-eye data voltage every 4n frames (where n is a natural number equal to or larger than 1) in response to an inversion signal. The display panel sequentially receives the left-eye data voltage, the black data voltage, the right-eye data voltage, and the black data voltage to alternately display a left-eye image and a right-eye image.

According to the exemplary embodiments of the present invention, a display apparatus includes a timing controller, a data driver, and a display panel.

The timing controller receives a first image frame for a left eye and a second image frame for a right eye in synchronization with a first control signal during a 3-D mode and receives a 2-D image frame in synchronization with a second control signal during a 2-D mode. During 3-D mode, the data driver converts the first image frame to a first data voltage and the second image frame to a second data voltage so as to alternately output the first and second data voltages. During 2-D mode, the data driver converts the 2-D image frame to a data voltage so as to output the data voltage. During 3-D mode, the display panel alternately receives the first data voltage and the second data voltage to alternately display a left-eye image and a right-eye image. During 2-D mode, the display panel receives the data voltage to display a 2-D image.

During 3-D mode, the data driver receives an inversion signal from the timing controller, and inverts a polarity of the first and second data voltages every 4n frames (n is a natural number equal to or larger than 1) in response to the inversion signal. During 2-D mode, the data driver inverts the data voltage every n frames.

According to the exemplary embodiments of the present invention, a method of driving a display apparatus is provided as follows. An image signal is divided into a first image frame for a left eye and a second image frame for a right eye. A first intermediate image frame and a second intermediate image frame, which are successive to the first image frame and the second image frame, respectively, are generated. The first image frame is converted to a first compensation frame and the second image frame is converted to a second compensation frame. The first compensation frame is converted to a left-eye data voltage and the second compensation frame is converted to a right-eye data voltage. The first and second intermediate image frames are converted to a black data voltage, corresponding to a predetermined black gray-scale, in response to a black insertion control signal. The left-eye data voltage, the black data voltage, the right-eye data voltage, and the black data voltage are sequentially provided to the display apparatus to alternately display a left-eye image and a right-eye image.

According to the exemplary embodiment, a polarity of the left-eye data voltage and the right-eye data voltage are inverted every 4n frames (where n is a natural number equal to or larger than 1).

According to the above, intermediate image frames which are successive to the left-eye image frame and the right-eye image frame, respectively, are generated when displaying the 3-D image, and the data driver converts the intermediate image frames to a black data voltage, thereby preventing the left-eye image and the right-eye image from being mixed with each other.

In addition, since the polarity of the left-eye data voltage and the right-eye data voltage are controlled to be inverted every 4 frames when the image signal is converted to the quad-speed image signal to display 3-D images, a residual DC component may be prevented from being generated when the left-eye image and the right-eye image are displayed on the display panel, thereby removing an after image.

BRIEF DESCRIPTION OF THE DRAWINGS

The above and other advantages of the present invention will become readily apparent by reference to the following detailed description when considered in conjunction with the accompanying drawings wherein:

FIG. 9 is a block diagram showing a display apparatus according to another exemplary embodiment of the present invention.

DETAILED DESCRIPTION

Figure 1:
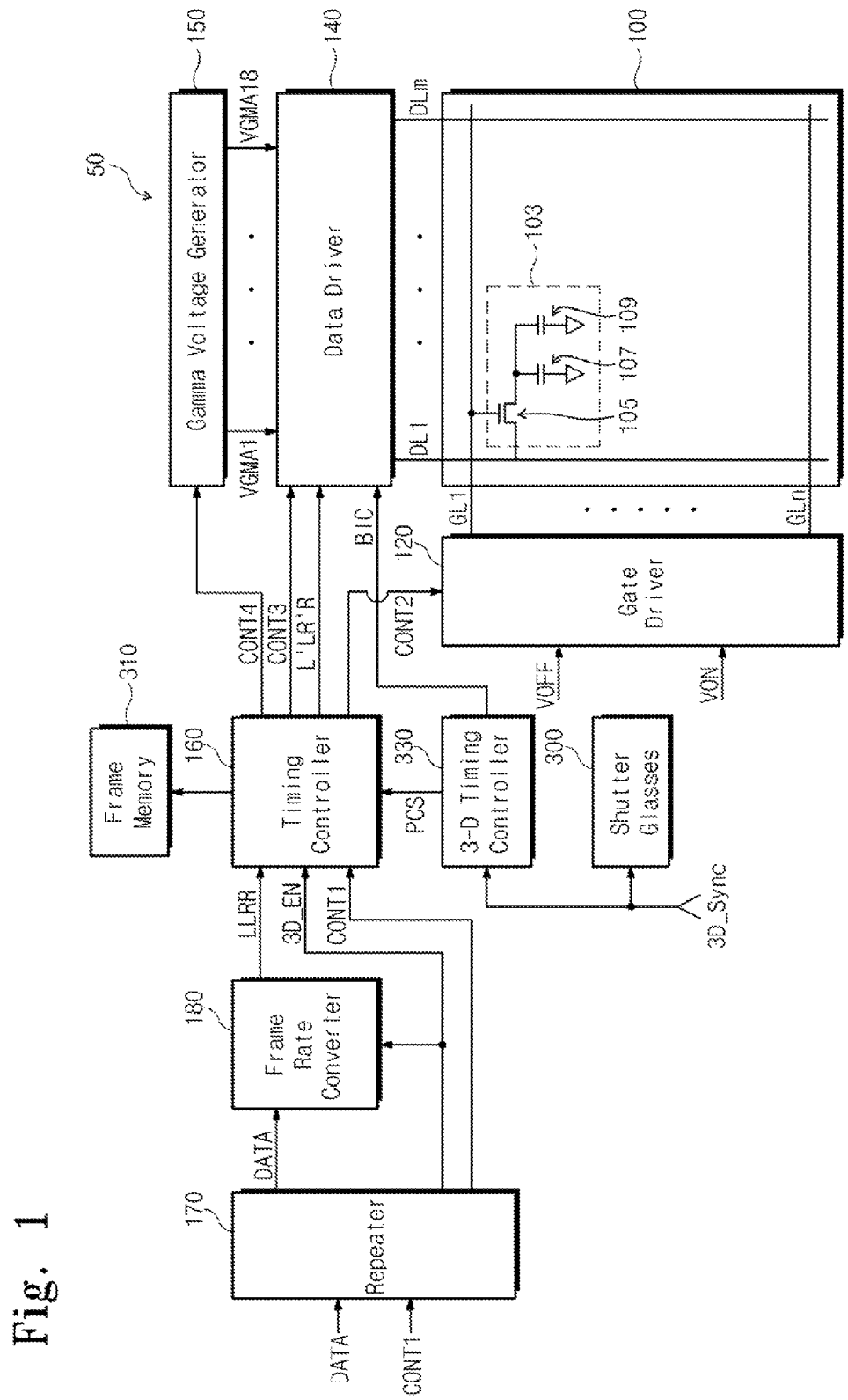
FIG. 1 is a block diagram showing a display apparatus according to an exemplary embodiment of the present invention.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

FIG. 1 is a block diagram showing a display apparatus according to an exemplary embodiment of the present invention.

Referring to FIG. 1, a display apparatus 50 includes a display panel 100 that displays an image, a gate driver 120 and a data driver 140 which drive the display panel 100, a gamma voltage generator 150 that is connected to the data driver 140, and a timing controller 160 that controls the gate driver 120 and the data driver 140. The display apparatus 50 may further include a repeater 170, a frame rate converter 180, a frame memory 310, a three-dimensional (3-D) timing converter 330, and a pair of shutter glasses 300.

The repeater 170 receives a two-dimensional (2-D) image signal DATA from a video system (not shown). The repeater 170 may receive the 2-D image signal DATA in a low voltage differential signaling (LVDS) method. The repeater 170 transmits the 2-D image signal DATA to the frame rate converter 180.

The frame rate converter 180 receives the 2-D image signal DATA from the repeater 170, and converts the 2-D image signal DATA to a 3-D image signal. In addition, the frame rate converter 180 converts the frame rate of the 3-D image signal to meet a frame rate of the display panel 100. For instance, the frame rate converter 180 may divide the 2-D image signal DATA having a frequency of about 60 Hz into an image frame for a left eye L (hereinafter, referred to as a left-eye image frame) and an image frame for a right eye R (hereinafter, referred to as a right-eye image frame) to produce a quad-speed image signal LLRR having a frequency of about 240 Hz. In the present exemplary embodiment, the frame rate converter 180 may have a driving frequency of about 240 Hz, but it should not be limited thereto or thereby. For example, the frame rate converter 180 may have a driving frequency of about 120 Hz or about 360 Hz, instead of (or in addition to) about 240 Hz.

The 60 Hz 2-D image signal DATA may include a plurality of frames, where each frame may be output during 1/60 seconds. Likewise, the quad-speed image signal LLRR may include a plurality of frames, where each frame may be output during 1/240 seconds.

In order to output the quad-speed image signal LLRR, the frame rate converter 180 divides the 2-D image signal DATA received from the repeater 170 into the left-eye image frame L and the right-eye image frame R, thus generating a double-speed image signal. Then, the frame rate converter 180 generates a first intermediate image frame L that is successive to the left-eye image frame L, as well as a second intermediate image frame R that is successive to the right-eye image frame R. The first intermediate image frame L may have the same values as the left-eye image frame L, and the second intermediate image frame R may have the same values as the right-eye image frame R. Thus, the frame rate converter 180 may convert the double-speed image signal to the quad-speed image signal LLRR, by duplicating the L and R frames.

In addition, while only one frame rate converter 180 has been shown in FIG. 1, the display apparatus 50 may include two frame rate converters. In the case that the display apparatus 50 includes two frame rate converters, a first frame rate converter may receive the 2-D image signal DATA from the repeater 170 and output a left-side image signal corresponding to a left side of the display panel 100, where "left" is defined here with reference to a center line of the display panel 100. A second frame rate converter may receive the 2-D image signal DATA from the repeater 170 and output a right-side image signal corresponding to a right side of the display panel 100, where "right" is defined here with reference to the center line.

Meanwhile, the timing controller 160 receives the quad-speed image signal LLRR from the frame rate converter 180, and also receives a control signal CONT1 from the repeater 170. The timing controller 160 compensates for the quad-speed image signal LLRR through a data compensation method, in order to compensate for a charge rate of each pixel. The timing controller 160 also outputs a quad-speed compensation image signal L'LR'R. In detail, the timing controller 160 compensates for the left-eye image frame L by outputting a left-eye compensation frame L', and compensates for the right-eye image frame R by outputting a right-eye compensation frame R'. In addition, the timing controller 160 outputs the first and second intermediate image frames L and R without compensating for them. The net effect of this is for the timing controller 160 to output the quad-speed compensation image signal L'LR'R. The reason that these frames L' and R' are described as compensating for frames L and R, respectively, is further described below.

The control signal CONT1 applied to the timing controller 160 may include a main clock signal MCLK, a vertical synchronization signal VSYNC, a horizontal synchronization signal HSYNC, and a data enable signal DE. The timing controller 160 generates a gate control signal CONT2 to control an operation of the gate driver 120, and a data control signal CONT3 to control an operation of the data driver 140. The timing controller 160 provides the gate control signal CONT2 and the data control signal CONT3 to the gate driver 120 and the data driver 140, respectively.

The timing controller 160 receives a 3-D enable signal 3D_EN, and generates a gamma selection control signal CONT4 in response to the 3-D enable signal 3D_EN. The gamma selection control signal CONT4 is applied to the gamma voltage generator 150. The gamma voltage generator 150 outputs 3-D gamma reference voltages VGMA1 to VGMA18 in response to the gamma selection control signal CONT4 having a high level. Although not shown in FIG. 1, in the case that the timing controller 160 receives a 2-D enable signal, the gamma voltage generator 150 may output a 2-D gamma reference voltage having a different voltage level from the 3-D gamma reference voltages VGMA1 to VGMA18 in response to the gamma selection control signal CONT4 having a low level.

The display panel 100 includes a plurality of gate lines GL1 to GLn each receiving a gate voltage, and a plurality of data lines DL1 to DLm each receiving a data voltage. A plurality of pixel areas is defined by the gate lines GL1 to GLn and the data lines DL1 to DLm, which can be laid out in a matrix configuration in the display panel 100, and a pixel 103 is arranged in each pixel area. Each pixel 103 includes a thin film transistor 105, a liquid crystal capacitor 107, and a storage capacitor 109.

The thin film transistor 105 includes a gate electrode connected to a first gate line GL1, a source electrode connected to a first data line DL1, and a drain electrode connected to the liquid crystal capacitor 107 and the storage capacitor 109. The liquid crystal capacitor 107 and the storage capacitor 109 are connected to the drain electrode in parallel.

Although not shown in FIG. 1, the display panel 100 may include a first display substrate (not shown), a second display substrate (not shown) facing the first display substrate, and a liquid crystal layer (not shown) interposed between the first display substrate and the second display substrate.

The first display substrate includes the gate lines GL1 to GLn, the data lines DL1 to DLm, the thin film transistor 105, and a pixel electrode that serves as a first electrode of the liquid crystal capacitor 107. The thin film transistor 105 applies the data voltage to the pixel electrode in response to the gate voltage.

The second display substrate includes a common electrode (not shown) that serves as a second electrode of the liquid crystal capacitor 107 formed thereon, and a reference voltage is applied to the common electrode. The liquid crystal layer interposed between the pixel electrode and the common electrode serves as the dielectric material of the liquid crystal capacitor 107. The liquid crystal capacitor 107 is charged with a voltage corresponding to an electric potential difference between the data voltage and the reference voltage The gate driver 120 is electrically connected to the gate lines GL1 to GLn, to apply the gate voltage to the gate lines GL1 to GLn. Particularly, the gate driver 120 generates gate signals, including a gate-on voltage VON and a gate-off voltage VOFF, in response to the gate control signal CONT2, and sequentially outputs the gate signals to the gate lines GL1 to GLn in order to drive them. The gate control signal CONT2 may include a vertical start signal STV indicating a start of an operation of the gate driver 120, a gate clock signal GCLK determining an output timing of the gate voltage, and an output enable signal OE determining an ON pulse width of the gate voltage.

The data driver 140 receives the quad-speed compensation image signal L'LR'R from the timing controller 160, and converts the left-eye compensation frame L' and the right-eye compensation frame R' to a left-eye data voltage and a right-eye data voltage, respectively, in response to the data control signal CONT3. The left-eye data voltage and the right-eye data voltage are applied to the display panel 100. Especially, the data driver 140 may respectively convert the left-eye compensation frame L' to the left-eye data voltage and the right-eye compensation frame R' to the right-eye data voltage based on the 3-D gamma reference voltages VGMA1 to VGMA18. The data control signal CONT3 may include a horizontal start signal STH indicating a start of an operation of the data driver 140, an inversion signal POL controlling a polarity of the left-eye data voltage and the right-eye data voltage, and a load signal TP determining an output timing of the left-eye data voltage and the right-eye data voltage.

Meanwhile, the data driver 140 converts the first and second intermediate image frames L and R of the quad-speed compensation image signal L'LR'R to a predetermined black data voltage in response to a black insertion control signal BIC, to provide the black data voltage to the display panel 100.

The data driver 140 is electrically connected to the data lines DL1 to DLm, and sequentially provides the left-eye data voltage, a black data voltage, the right-eye data voltage, and a black data voltage to the data lines DL1 to DLm.

The display apparatus 50 further includes a frame memory 310 connected to the timing controller 160 to store a previous image frame, and a 3-D timing converter 330 to provide the black insertion control signal BIC to the data driver 140.

The frame memory 310 sequentially stores the quad-speed image signal LLRR applied to the timing controller 160. As an example, in the case that the right-eye image frame R is provided to the timing controller 160, the frame memory 310 stores the first intermediate image frame L, which is a previous frame, and provides the first intermediate image frame L to the timing controller 160 according to a request from the timing controller 160. The timing controller 160 may then convert the right-eye image frame R to the right-eye compensation frame R' based on the data of the first intermediate image frame L.

The 3-D timing converter 330 receives a 3-D synchronization signal 3D_Sync from the video system, and provides the black insertion control signal BIC to the data driver 140 in response to the 3-D synchronization signal 3D_Sync. Also, the 3-D timing converter 330 provides an inversion control signal PCS to the timing controller 160. The timing controller 160 changes a period of the inversion signal POL (which is used to control the polarity of the left-eye data voltage and the right-eye data voltage) in response to the inversion control signal PCS, and provides the inversion signal POL to the data driver 140. For instance, when a 2-D synchronization signal is generated, the timing controller 160 may change an inversion period of the inversion signal POL to n frames (n is a natural number equal to or larger than 1), and when the 3-D synchronization signal 3D_Sync is generated, the timing controller 160 may change the inversion period of the inversion signal POL to 4n frames (n is a natural number equal to or larger than 1).

The display apparatus 50 further includes shutter glasses 300, which are used to observe the image displayed on the display panel 100.

The shutter glasses 300 include a left-eye shutter (not shown) and a right-eye shutter (not shown). The shutter glasses 300 receive the 3-D synchronization signal 3D_Sync, and sequentially operate the left-eye shutter and the right-eye shutter in response to the 3-D synchronization signal 3D_Sync. Thus, when a user wears the shutter glasses 300, the user perceives the left eye and right eye images sequentially, producing the impression of a 3-D image.

Figure 2:
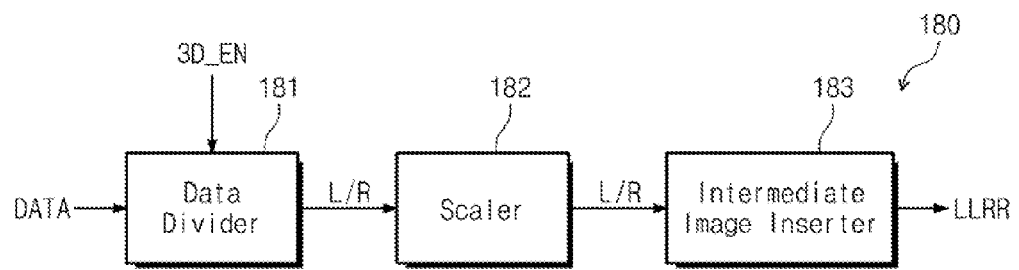
FIG. 2 is a block diagram showing a frame rate converter of FIG. 1.

FIG. 2 is a block diagram showing the frame rate converter of FIG. 1.

Referring to FIG. 2, the frame rate converter 180 may include a data divider 181, a scaler 182, and an intermediate image inserter 183.

The data divider 181 receives the 2-D image signal DATA from the repeater 170, and divides the 2-D image signal DATA into the left-eye image frame L and the right-eye image frame R in response to the 3-D enable signal 3D_EN. The data divider 181 then outputs a double-speed image signal L/R to the scaler 182.

The scaler 182 converts the format of the left-eye image frame L and the right-eye image frame R to allow a resolution of the left-eye image frame L and the right-eye image frame R to meet a resolution of the display panel 100.

The intermediate image inserter 183 generates the first intermediate image frame L having the same value as an n-th left-eye image frame L, and places it between the n-th left-eye image frame L and the n-th right-eye image frame R received from the scaler 183. In addition, the intermediate image inserter 183 generates the second intermediate image frame R having the same value as the n-th right-eye image frame R, and places it between the n-th right-eye image frame R and an (n+1)th left-eye image frame L received from the scaler 183 (i.e., places it after the n-th right-eye image frame R).

Thus, the intermediate image inserter 183 may sequentially output the n-th left-eye image frame L, the first intermediate image frame L, the n-th right-eye image frame R, and the second intermediate image frame R, so that the double-speed image signal L/R may be converted to the quad-speed image signal LLRR.

Although not shown in figures, in the case that the frame rate converter 180 receives a 2-D image signal at a frequency of about 60 Hz, the frame rate converter 180 may change only the frame rate of the 2-D image signal without dividing the 2-D image signal into the image frame for the left eye and the image frame for the right eye. That is, the frame rate converter 180 may convert the 2-D image signal having the frequency of about 60 Hz to a quad-speed 2-D image signal having a frequency of about 240 Hz, to output the quad-speed 2-D image signal.

Figure 3:
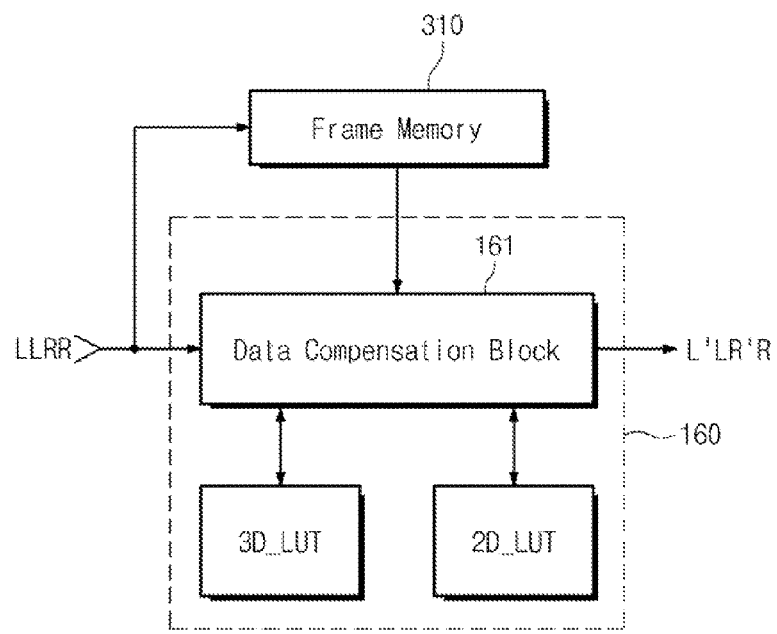
FIG. 3 is a block diagram showing a timing controller of FIG. 1.

FIG. 3 is a block diagram showing the timing controller of FIG. 1.

Referring to FIG. 3, the timing controller 160 includes a data compensation block 161, a first look-up table 3D_LUT, and a second look-up table 2D_LUT. The first look-up table 3D_LUT stores a 3-D compensation value, and the second look-up table 2D_LUT stores a 2-D compensation value. Thus, the data compensation block 161 refers to the first look-up table 3D_LUT during 3-D, mode and refers to the second look-up table 2D_LUT during 2-D mode.

As shown in FIG. 3, when the data compensation block 161 receives the quad-speed image signal LLRR, the data compensation block 161 refers to the first look-up table 3D_LUT to convert the quad-speed image signal LLRR to the quad-speed compensation image signal L'LR'R.

The frame memory 310 sequentially stores frames of the quad-speed image signal LLRR. As an example, when the data compensation block 161 receives the left-eye image frame L, the second intermediate image frame R, which is the last image frame of the previous image frame, is stored in the frame memory 310 and R is thus provided to the data compensation block 161 when the data compensation block 161 requests it. The data compensation block 161 may convert the left-eye image frame L to the left-eye compensation frame L' based on the data of the second intermediate image frame R, i.e. based on the last image frame to be stored in memory 310.

Also, in the case that the data compensation block 161 receives the right-eye image frame R, the first intermediate image frame L, which is the last image frame of the previous image frame, is stored in the frame memory 310. Upon request by the data compensation block 161, the memory 31 would thus provide the first intermediate image frame L to the data compensation block 161. The data compensation block 161 may convert the right-eye image frame R to the right-eye compensation frame R' based on the data of the first intermediate image frame L.

In the case that the data compensation block 161 receives the first and second intermediate image frames L and R, the data compensation block 161 outputs the first and second intermediate image frames L and R without compensation. Since the first and second intermediate image frames L and R are not substantially provided to the display panel 100, the data compensation for the first and second intermediate image frames L and R is not required. Therefore, the timing controller 160 may output the quad-speed compensation image signal L'LR'R in the order of the left-eye compensation frame L', the first intermediate image frame L, the right-eye compensation frame R', and the second intermediate image frame R.

As described above, the first intermediate image frame L has the same value as the left-eye image frame L, and the second intermediate image frame R has the same value as the right-eye image frame R. Thus, when the data compensation block 161 compensates for the right-eye image frame R, the data compensation block 161 may refer to the first intermediate image frame L, which is a previous frame of the right-eye image frame R. Similarly, when the data compensation block 161 compensates for the left-eye image frame L, the data compensation block 161 may refer to the second intermediate image frame R, which is a previous frame of the left-eye image frame L.

In the case that the first intermediate image frame L has the same value as the left-eye image frame L and the second intermediate image frame R has the same value as the right-eye image frame R, the frame memory 310 only needs to store data corresponding to one frame for the data compensation. However, when the first and second intermediate image frames L and R have different values from the left-eye image frame L and the right-eye image frame R respectively, the frame memory 310 is required to store data corresponding to two frames, thereby making it beneficial to employ two frame memories. Accordingly, in the present exemplary embodiment as described above, the first and second intermediate image frames L and R have the same values as the left-eye image frame L and the right-eye image frame R, respectively, and thus, only a single frame memory is used.

Figure 4:
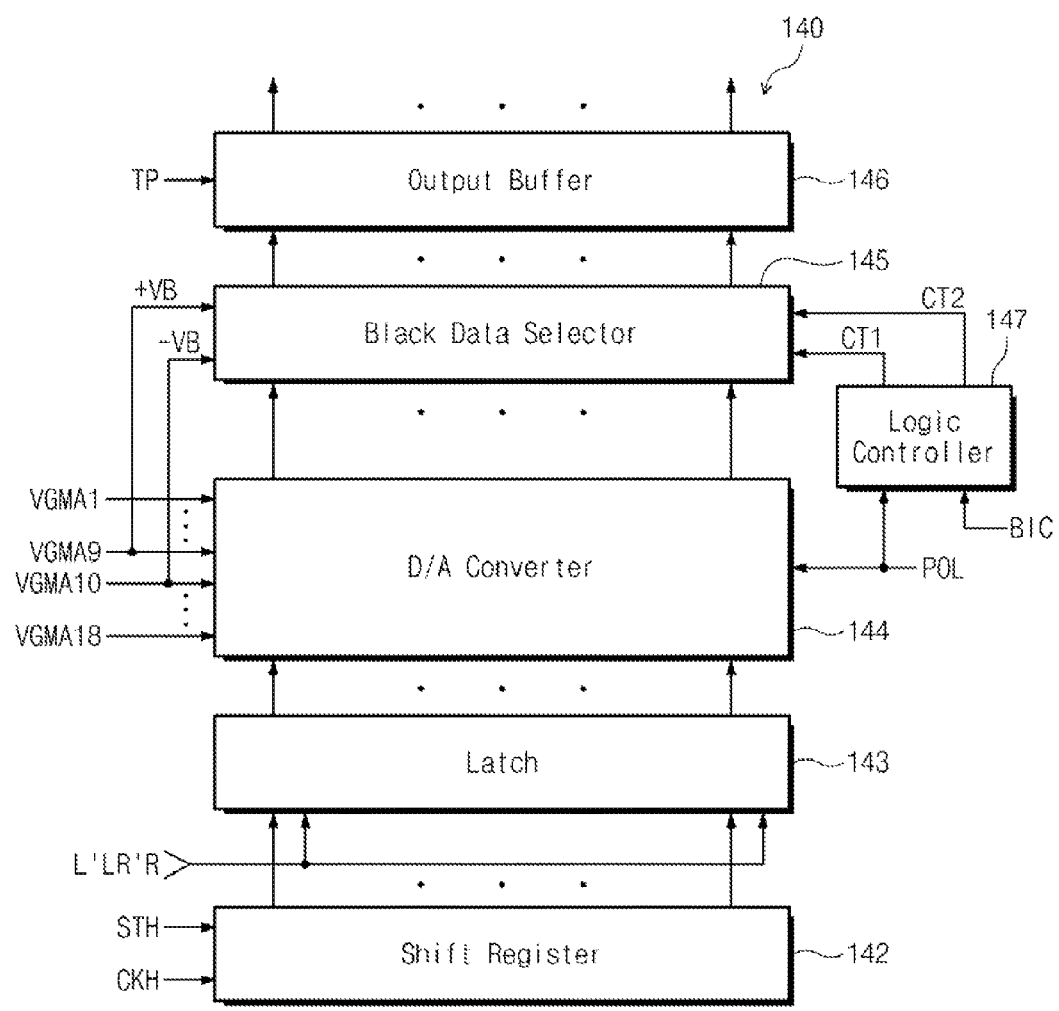
FIG. 4 is a block diagram showing a data driver of FIG. 1.
Figure 5:
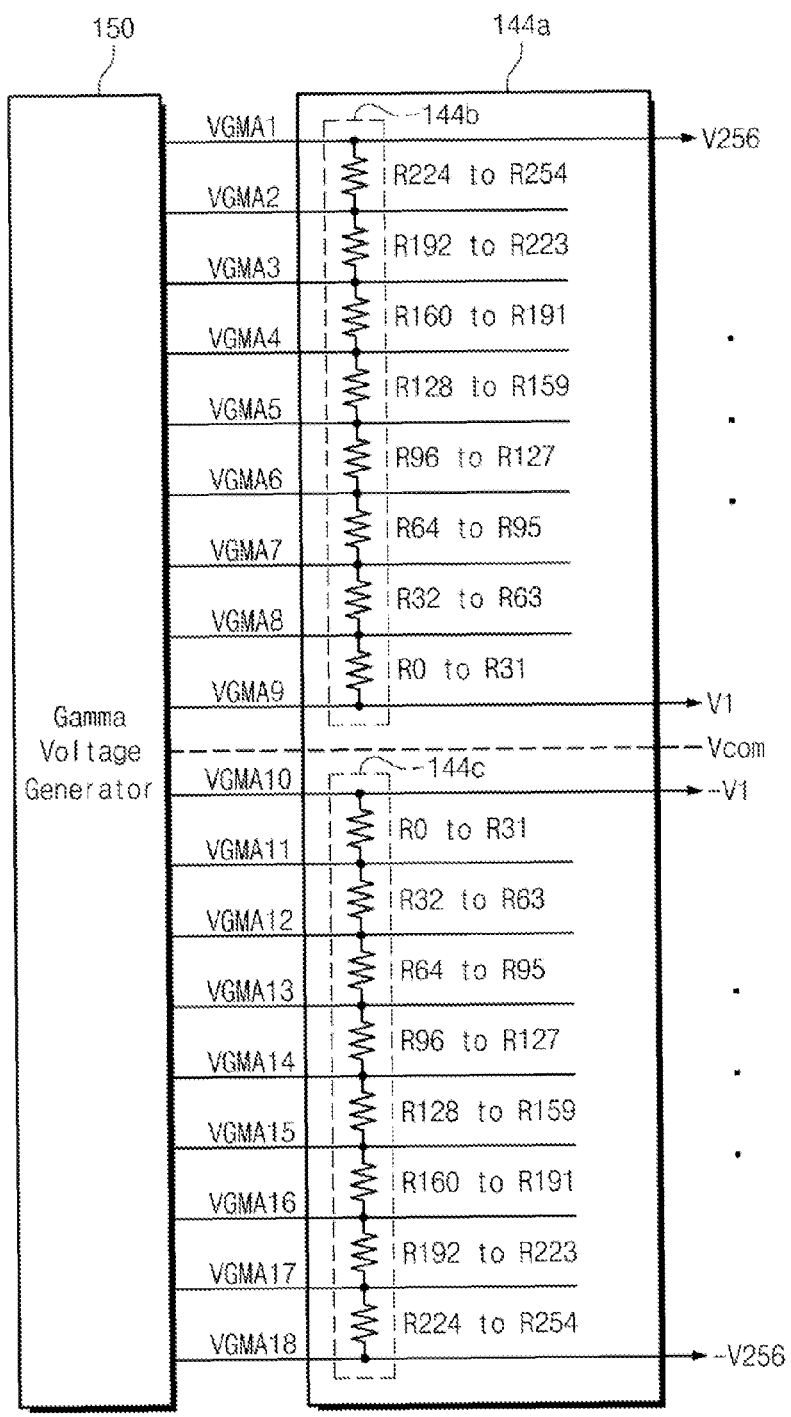
FIG. 5 is a view showing a resistor string arranged in a D/A converter of FIG. 4.

FIG. 4 is a block diagram showing the data driver of FIG. 1, and FIG. 5 is a view showing a resistor string arranged in a D/A converter of FIG. 4.

Referring to FIG. 4, the data driver 140 includes a shift register 142, a latch 143, a D/A converter 144, a black data selector 145, a logic controller 147, and an output buffer 146.

The shift register 142 includes a plurality of stages (not shown) connected one after another to each other. Each stage receives a horizontal clock signal CKH, and a first stage among the stages receives a horizontal start signal STH. When the first stage starts its operation in response to the horizontal start signal STH, the stages sequentially output control signals in response to the horizontal clock signal CKH.

The latch 143 receives the quad-speed compensation image signal L'LR'R from the timing controller 160, and sequentially latches data corresponding to one line of the quad-speed compensation image signal L'LR'R in response to the control signals from the stages. The latch 143 provides the latched data to the D/A converter 14.

The D/A converter 144 receives the data provided from the latch 143, and converts the received data to a data voltage based on the gamma reference voltages VGMA1 to VGMA18.

Referring to FIG. 5, the D/A converter 144 may include a resistor string 144a that converts the eighteen gamma reference voltages VGMA1 to VGMA18 to $2\times2^k$ gray-scale voltages (k is a natural number equal to or larger than 1). In the present exemplary embodiment, "k" may be defined as the number of bits of the data. That is, when the data is 8-bit data, the resistor string 144a may convert the 8-bit data to 512 gray-scale voltages.

Also, the resistor string 144a includes a positive-polarity resistor string 144b and a negative-polarity resistor string 144c, such that the gray-scale voltages may have a polarity. More specifically, the positive-polarity resistor string 144b may generate 256 positive gray-scale voltages V1 to V256 based on first to ninth gamma reference voltages VGMA1 to VGMA9, while the negative-polarity resistor string 144c may generate 256 negative gray-scale voltages −V1 to −V256 based on tenth to eighteenth gamma reference voltages VGMA10 to VGMA18. In the present exemplary embodiment, the voltage level of the gamma reference voltages VGMA1 to VGMA18 may gradually decrease in order from the first gamma reference voltage VGMA1 to the eighteenth gamma reference voltage VGMA18.

The positive gray-scale voltages V1 to V256 have a positive polarity with reference to a predetermined reference voltage (hereinafter, referred to as a common voltage Vcom), and the negative gray-scale voltages −V1 to −V256 have a negative polarity with reference to the common voltage Vcom. In the present exemplary embodiment, the positive gray-scale voltages V1 to V256 have gray-scales that increase with distance from the common voltages Vcom. That is, higher-numbered positive gray-scale voltages represent whiter gray scales, and lower-numbered positive gray-scale voltages represent blacker gray scales. Similarly, the negative gray-scale voltages −V1 to −V256 have higher gray-scales (that is, the white gray-scale) with greater distance from the common voltage Vcom.

Referring again to FIG. 4, the D/A converter 144 selects either the positive-polarity resistor string 144b or the negative-polarity resistor string 144c based on the inversion signal POL, selects a gray-scale voltage corresponding to the data from among the 256 gray-scale voltages output from the selected resistor string 144b or 144c, and outputs the selected gray-scale voltage as the data voltage. The data voltage output is applied to the black data selector 145.

The logic controller 147 generates a first control signal CT1 and a second control signal CT2 based on the inversion signal POL and the black insertion control signal BIC, and applies the first and second control signals CT1 and CT2 to the black data selector 145.

The black data selector 145 receives the first and second control signals CT1 and CT2, and receives the ninth gamma reference voltage VGMA9 and the tenth gamma reference voltage VGMA10 output from the gamma voltage generator 150. Thus, the black data selector 145 outputs either the ninth gamma reference voltage VGMA9 or the tenth gamma reference voltage VGMA10 as the black data voltage, in response to the first and second control signals CT1 and CT2.

Particularly, when the first control signal CT1 is in a high state and the second control signal CT2 is in a low state, the ninth gamma reference voltage VGMA9, which has a positive polarity with reference to the common voltage Vcom and a black gray-scale closest to the common voltage Vcom, is output as a first black data voltage +VB with positive polarity. Meanwhile, when the first control signal CT1 is in the low state and the second control signal CT2 is in the high state, the tenth gamma reference voltage VGMA10, which has a negative polarity with reference to the common voltage Vcom and a black gray-scale closest to the common voltage Vcom, is output as a second black data voltage −VB with negative polarity.

The output buffer 146 includes a plurality of operational amplifiers (not shown) and temporarily stores one of the data voltage, the first black data voltage +VB, and the second black data voltage −VB output from the black data selector 145, to substantially simultaneously output these stored voltages in response to a load signal TP.

Figure 6:
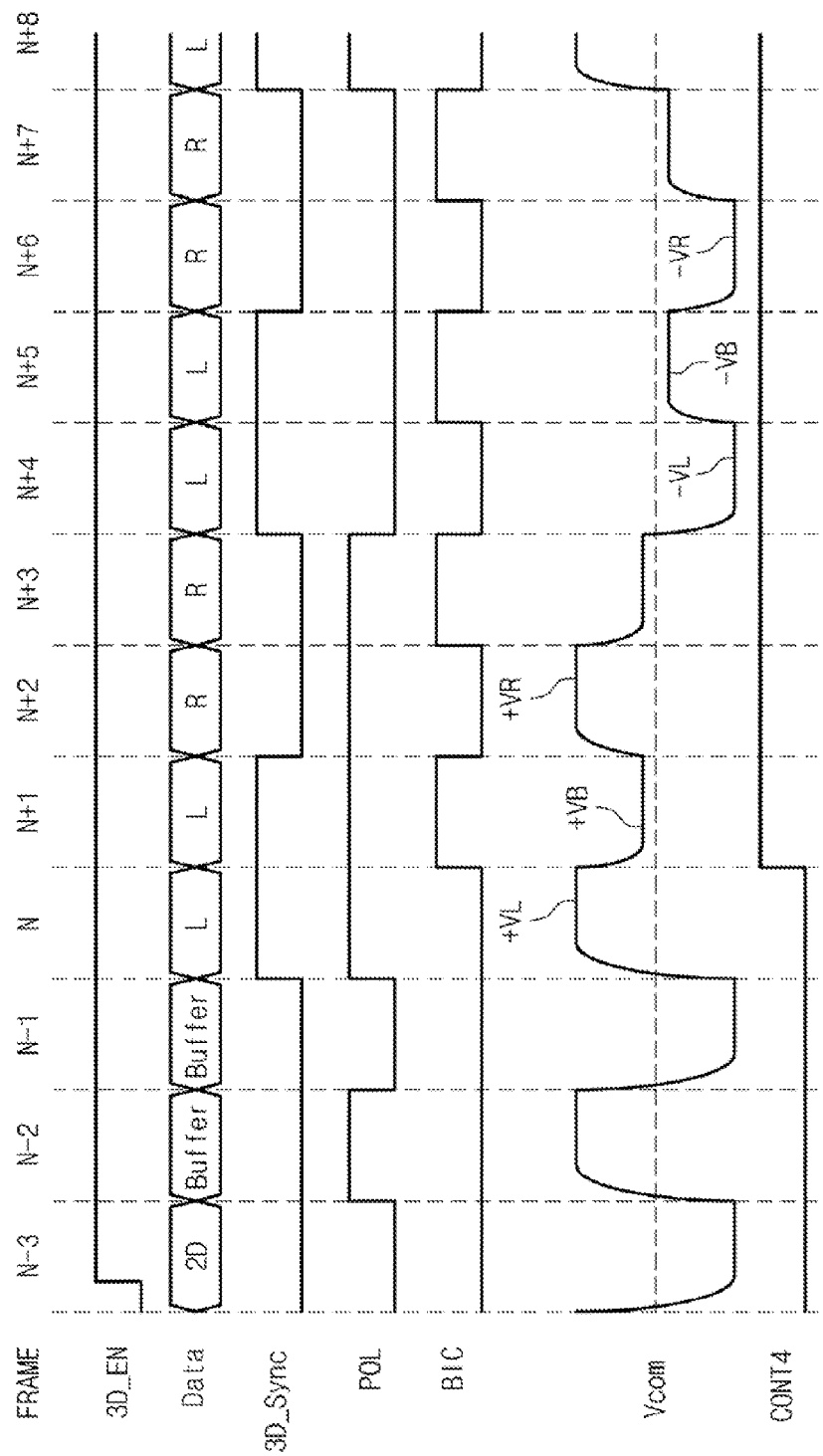
FIG. 6 is a waveforms diagram showing an operation of a display apparatus with reference to FIGS. 1 to 4.

FIG. 6 is a waveforms diagram showing an operation of the display apparatus with reference to FIGS. 1 to 4.

Referring to FIG. 6, the frame rate converter 180 receives the 2-D image signal DATA from the repeater 170, and converts the 2-D image signal DATA to the 3-D image signal LLRR in response to the 3-D enable signal 3D_EN. Particularly, the frame rate converter 180 divides the 2-D image signal DATA into a left-eye image frame L and a right-eye image frame R, and inserts an intermediate image frame between the left-eye image frame L and the right-eye image frame R to output the quad-speed image signal LLRR as the 3-D image signal.

As shown in FIG. 6, when the 3-D enable signal 3D_EN moves to a high state in an (N−3)th frame period, the frame rate converter 180 uses an (N−2)th frame and an (N−1)th frame as a buffer period to divide the 2-D image signal DATA into the 3-D image signal LLRR, and outputs the 3-D image signal LLRR at the beginning of an N-th frame period. As an example, the left-eye image frame L is output during the N-th frame period, the first intermediate image frame L having the same value as the left-eye image frame L is output during an (N+1)th frame period, the right-eye image frame R is output during an (N+2) frame period, and the second intermediate image frame R having the same value as the right-eye image frame R is output during an (N+3) frame period.

The 3-D timing controller 330 applies the inversion control signal PCS to the timing controller 160 in response to the 3-D image synchronization signal 3D_Sync provided from the video system. In the present exemplary embodiment, the 3-D image synchronization signal 3D_Sync may be maintained at a high level during two frames corresponding to the left-eye image frame L and the first intermediate image frame L, and may be maintained at a low level during two frames corresponding to the right-eye image frame R and the second intermediate image frame R.

The timing controller 160 controls an inversion period of the inversion signal POL in response to the inversion control signal PCS. In detail, the inversion signal POL is inverted every frame during the (N−3)th frame period, the (N−2)th frame period, and the (N−1)th frame period. Then, when the inversion control signal PCS (which is generated based on the 3-D synchronization signal 3D_Sync) is applied to the timing controller 160, the inversion signal POL is inverted every four frames. That is, the inversion signal POL is inverted every four frames, starting at the beginning of the N-th frame period, when the 3-D synchronization signal 3D_Sync is generated.

In addition, the 3-D timing converter 330 applies the black insertion control signal BIC at a high level to the data driver 140 during the (N+1)th frame period, in order to convert the first and second intermediate image frames L and R to the black data voltage in response to the 3-D synchronization signal 3D_Sync having the high level during two frame period.

The data driver 140 provides a positive-polarity left-eye data voltage +VL to the data lines DL1 to DLm during the N-th frame period, in response to the inversion signal POL. This data voltage +VL corresponds to the left-eye image frame L. Then, the data driver 140 converts the first intermediate image frame L to a positive-polarity first black data voltage +VB, which is applied to the data lines DL1 to DLm during the (N+1)th frame period in response to the first and second control signals CT1 and CT2 (shown in FIG. 4). As above, CT1 and CT2 are transmitted according to the black insertion control signal BIC and the inversion signal POL.

In addition, the data driver 140 provides a positive-polarity right-eye data voltage +VR to the data lines DL1 to DLm during the (N+2)-th frame period, in response to the inversion signal POL. The voltage +VR corresponds to the right-eye image frame R. Then, the data driver 140 converts the second intermediate image frame R to the positive-polarity first black data voltage +VB, which is applied to the data lines DL1 to DLm during the (N+3)th frame period in response to the first and second control signals CT1 and CT2 (shown in FIG. 4). CT1 and CT2 are generated based on the black insertion control signal BIC and the inversion signal POL.

Thus, the positive-polarity left-eye data voltage +VL, the positive-polarity first black data voltage +VB, the positive-polarity right-eye data voltage +VR, and the positive-polarity first black data voltage +VB are sequentially output during the consecutive N-th, (N+1)th, (N+2)th, and (N+3)th frame periods.

Next, when the inversion signal POL is inverted, the data driver 140 provides a negative-polarity left-eye data voltage −VL, corresponding to the left-eye image frame L, to the data lines DL1 to DLm during an (N+4)th frame period. The data driver 140 converts the first intermediate image frame L to a negative-polarity second black data voltage −VB, and provides −VB to the data lines DL1 to DLm during an (N+5)th frame period in response to the first and second control signals CT1 and CT2. As above, CT1 and CT2 are based on the black insertion control signal BIC and the inversion signal POL.

Also, the data driver 140 provides a negative-polarity right-eye data voltage −VR, corresponding to the right-eye image frame R, to the data lines DL1 to DLm during an (N+6)-th frame period in response to the inversion signal POL. Then, the data driver 140 converts the second intermediate image frame R to the negative-polarity second black data voltage −VB, and provides −VB to the data lines DL1 to DLm during an (N+7)th frame period in response to the first and second control signals CT1 and CT2. CT1 and CT2 are based on the black insertion control signal BIC and the inversion signal POL.

Thus, the negative-polarity left-eye data voltage −VL, the negative-polarity first black data voltage −VB, the negative-polarity right-eye data voltage −VR, and the negative-polarity second black data voltage −VB are sequentially output during the consecutive (N+4)th, (N+5)th, (N+6)th, and (N+7)th frame periods.

As described above, according to the present exemplary embodiment, the display apparatus inserts an intermediate image frame between the left-eye image frame and the right-eye image frame when displaying the 3-D image, and converts this intermediate image frame to the first black data voltage +VB or the second black data voltage −VB, thereby substantially preventing the left-eye image and the right-eye image from being mixed with each other.

In addition, when the image signal is converted to a quad-speed image signal to display 3-D images, the polarity of the left-eye image data and the right-eye image data voltage applied to the display panel may be inverted every four frames. Thus, a residual DC component may be prevented from being generated when the left-eye image and the right-eye image are displayed on the display panel, thereby removing or reducing an after image.

Figure 7A:
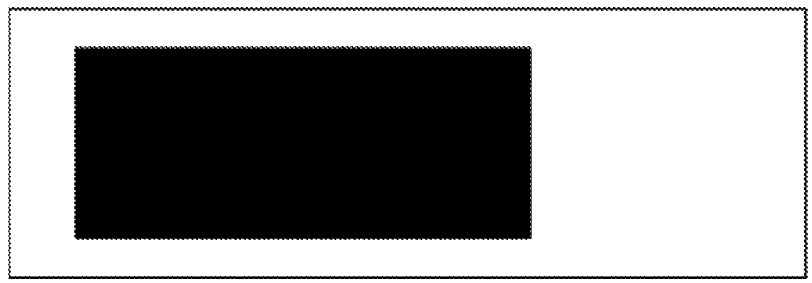
FIG. 7A is a plan view showing a left-eye image displayed on a display panel.
Figure 7B:
FIG. 7B is a plan view showing a right-eye image displayed on a display panel.
Figure 7C:
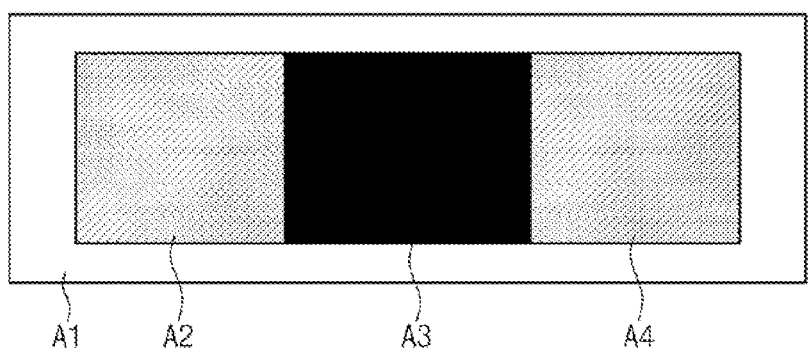
FIG. 7C is a plan view showing an image perceived by a user.

FIG. 7A is a plan view showing a left-eye image displayed on a display panel, FIG. 7B is a plan view showing a right-eye image displayed on a display panel, and FIG. 7C is a plan view showing an image perceived by a user.

Referring to FIG. 7A, the left-eye image is displayed in the white gray-scale in a first area A1 and a fourth area A4, and is displayed in the black gray-scale in a second area A2 and a third area A3 with reference to the display screen shown in FIG. 7C.

Referring to FIG. 7B, the right-eye image is displayed in the white gray-scale in the first area A1 and the second area A2, and is displayed in the black gray-scale in the third area A3 and the fourth area A4 with reference to the display screen shown in FIG. 7C.

Referring to FIG. 7C, the user perceives a composite image in which the left-eye image and the right-eye image are mixed with each other. Therefore, the user perceives the white gray-scale in the first area A1, a gray gray-scale in the second and fourth areas A4, and the black gray-scale in the third area A3.

Figure 8A:
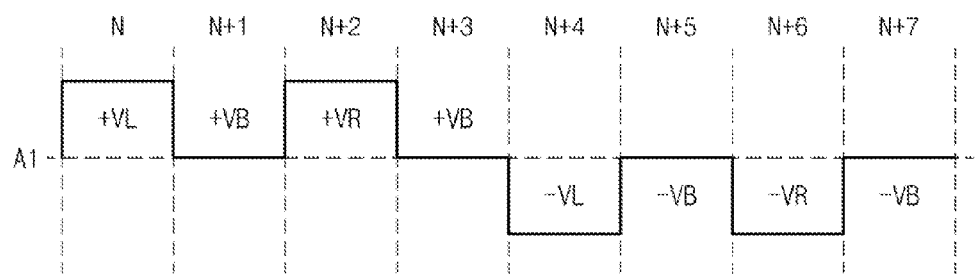
FIG. 8A is a waveform diagram showing a signal applied to the first area of FIG. 7C in the order of time.
Figure 8B:
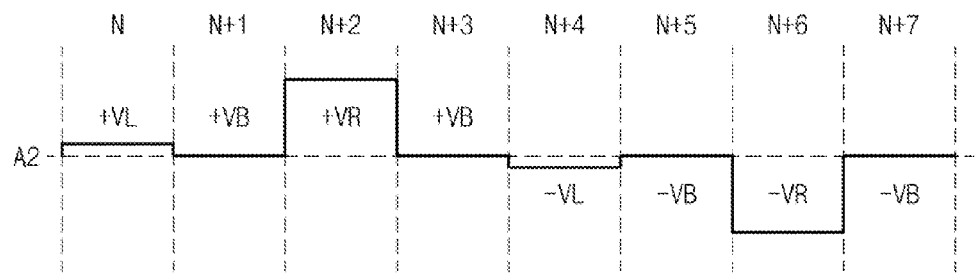
FIG. 8B is a waveform diagram showing a signal applied to the second area of FIG. 7C in the order of time.
Figure 8C:
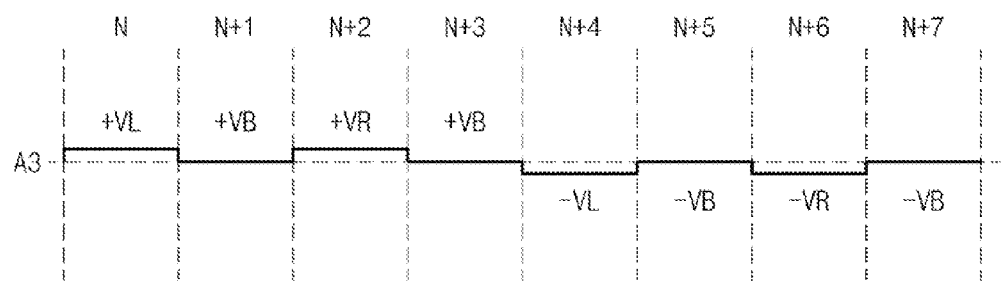
FIG. 8C is a waveform diagram showing a signal applied to the third area of FIG. 7C in the order of time.
Figure 8D:
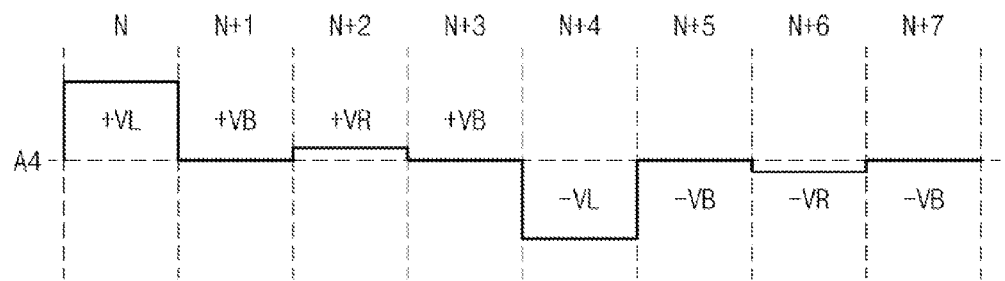
FIG. 8D is a waveform diagram showing a signal applied to the fourth area of FIG. 7C in the order of time.

FIG. 8A is a waveform diagram showing a signal applied to the first area A1 of FIG. 7C, FIG. 8B is a waveform diagram showing a signal applied to the second area A2 of FIG. 7C, FIG. 8C is a waveform diagram showing a signal applied to the third area A3 of FIG. 7C, and FIG. 8D is a waveform diagram showing a signal applied to the fourth area A4 of FIG. 7C.

Referring to FIG. 8A, since both the left-eye image and the right-eye image are displayed in the white gray-scale in the first area A1, both the left-eye data voltage and the right-eye data voltage have a gray-scale level corresponding to the white gray-scale. More specifically, the positive-polarity left-eye data voltage +VL having a gray-scale level corresponding to the white gray-scale is applied to the first area A1 during the N-th frame period, the positive-polarity first black data voltage +VB is applied to the first area A1 during the (N+1)th frame period, the positive-polarity right-eye data voltage +VR having a gray-scale level corresponding to the white gray-scale is applied to the first area A1 during the (N+2)th frame period, and the positive-polarity first black data voltage +VB is applied to the first area A1 during the (N+3)th frame period. Subsequently, the negative-polarity left-eye data voltage −VL having a gray-scale level corresponding to the white gray-scale, the negative-polarity second black data voltage −VB, the negative-polarity right-eye data voltage −VR having a gray-scale level corresponding to the white gray-scale, and the negative-polarity second black data voltage −VB are applied to the first area A1 during the (N+4)th, (N+5)th, (N+6)th, and (N+7)th frame periods, respectively.

Meanwhile, referring to FIG. 8B, since the left-eye image is displayed in the black gray-scale in the second area A2 of FIG. 7C and the right-eye image is displayed in the white gray-scale in the second area A2 of FIG. 7C, the left-eye data voltage has a gray-scale level corresponding to the black gray-scale, and the right-eye data voltage has a gray-scale level corresponding to the white gray-scale.

More specifically, the positive-polarity left-eye data voltage +VL having a gray-scale level corresponding to the black gray-scale is applied to the second area A2 during the N-th frame period, the positive-polarity first black data voltage +VB is applied to the second area A2 during the (N+1)th frame period, the positive-polarity right-eye data voltage +VR having a gray-scale level corresponding to the white gray-scale is applied to the second area A2 during the (N+2)th frame period, and the positive-polarity first black data voltage +VB is applied to the second area A2 during the (N+3)th frame period. After that, the negative-polarity left-eye data voltage −VL having a gray-scale level corresponding to the black gray-scale, the negative-polarity second black data voltage −VB, the negative-polarity right-eye data voltage −VR having a gray-scale level corresponding to the white gray-scale, and the negative-polarity second black data voltage −VB are applied to the second area A2 during the (N+4)th, (N+5)th, (N+6)th, and (N+7)th frame periods, respectively.

Referring to FIG. 8C, since both the left-eye image and the right-eye image are displayed in the black gray-scale in the third area A3 of FIG. 7C, the left-eye data voltage and the right-eye data voltage have a gray-scale level corresponding to the black gray-scale. In particular, the positive-polarity left-eye data voltage +VL having a gray-scale level corresponding to the black gray-scale is applied to the third area A3 during the N-th frame period, the positive-polarity first black data voltage +VB is applied to the third area A3 during the (N+1)th frame period, the positive-polarity right-eye data voltage +VR having a gray-scale level corresponding to the black gray-scale is applied to the third area A3 during the (N+2)th frame period, and the positive-polarity first black data voltage +VB is applied to the third area A3 during the (N+3)th frame period. Next, the negative-polarity left-eye data voltage −VL having a gray-scale level corresponding to the black gray-scale, the negative-polarity second black data voltage −VB, the negative-polarity right-eye data voltage −VR having a gray-scale level corresponding to the black gray-scale, and the negative-polarity second black data voltage −VB are applied to the third area A3 during the (N+4)th, (N+5)th, (N+6)th, and (N+7)th frame periods, respectively.

Referring to FIG. 8D, since the left-eye image is displayed in the white gray-scale in the fourth area A4 of FIG. 7C and the right-eye image is displayed in the black gray-scale in the fourth area A4 of FIG. 7C, the left-eye data voltage has a gray-scale level corresponding to the white gray-scale, and the right-eye data voltage has a gray-scale level corresponding to the black gray-scale.

In further detail, the positive-polarity left-eye data voltage +VL having a gray-scale level corresponding to the white gray-scale is applied to the fourth area A4 during the N-th frame period, the positive-polarity first black data voltage +VB is applied to the fourth area A4 during the (N+1)th frame period, the positive-polarity right-eye data voltage +VR having a gray-scale level corresponding to the black gray-scale is applied to the fourth area A4 during the (N+2)th frame period, and the positive-polarity first black data voltage +VB is applied to the fourth area A4 during the (N+3)th frame period. Subsequently, the negative-polarity left-eye data voltage −VL having a gray-scale level corresponding to the white gray-scale, the negative-polarity second black data voltage −VB, the negative-polarity right-eye data voltage −VR having a gray-scale level corresponding to the black gray-scale, and the negative-polarity second black data voltage −VB are applied to the fourth area A4 during the (N+4)th, (N+5)th, (N+6)th, and (N+7)th frame periods, respectively.

As described above, when the polarity of each of the left-eye data voltages and the right-eye data voltages are inverted every four frames, the left-eye image and the right-eye image may be prevented from being displayed with the same polarity, thereby removing or reducing the after image caused by the residual DC component.

In addition, when a black image is inserted between the left-eye image and the right-eye image, the black data voltage may have the same polarity as the polarity of the data voltage in the previous frame period. In addition, as shown in FIG. 5, the black data voltage may use two gamma reference voltages VGMA9 and VGMA10 having a black gray scale level. The two gamma reference voltages VGMA9 and VGMA10 have different polarities from each other. Therefore, the black data voltage may have the polarity by using the two gamma reference voltages VGMA9 and VGMA10.

FIG. 9 is a block diagram showing a display apparatus according to another exemplary embodiment of the present invention. In FIG. 9, like reference numerals denote like elements of FIG. 1, and thus detailed descriptions of the same elements will be omitted.

Referring to FIG. 9, a display apparatus 55 includes a display panel 100, a gate driver 120 and a data driver 140 which drive the display panel 100, a gamma voltage generator 150 that is connected to the data driver 140, and a timing controller 190 that controls the gate driver 120 and the data driver 140. The display apparatus 55 may further include a repeater 170 and a frame rate converter 180.

The display apparatus 55 shown in FIG. 9 has largely the same structure and function as the display apparatus 50 shown in FIG. 1, except that the 3-D timing converter 330 and the frame memory 310 are built into the timing controller 190.

The timing controller 190 receives the quad-speed image signal LLRR from the frame rate converter 180, and receives the control signal CONT1 from the repeater 170. The timing controller 190 compensates for the quad-speed image signal LLRR through a data compensation method to compensate for the charge rate of each pixel, so as to output the quad-speed compensation image signal L'LR'R. More specifically, the timing controller 190 compensates for the left-eye image frame L to output the left-eye compensation frame L', and compensates for the right-eye image frame R to output the right-eye compensation frame R'. In addition, the timing controller 190 outputs the first intermediate image frame L and the second intermediate image frame R without compensation.

The timing controller 190 may include a frame memory 310 that sequentially stores the frames of the quad-speed image signal LLRR. Also, the timing controller 190 receives the 3-D synchronization signal 3D_Sync from the video system, and provides the black insertion control signal BIC to the data driver 140 in response to the 3-D synchronization signal 3D_Sync.

In the present exemplary embodiment, the functions of the 3-D timing converter 330 and the frame memory 310 shown in FIG. 1 are processed by the timing controller 190, thereby reducing the number of parts in the display apparatus 55.

Figure 10:
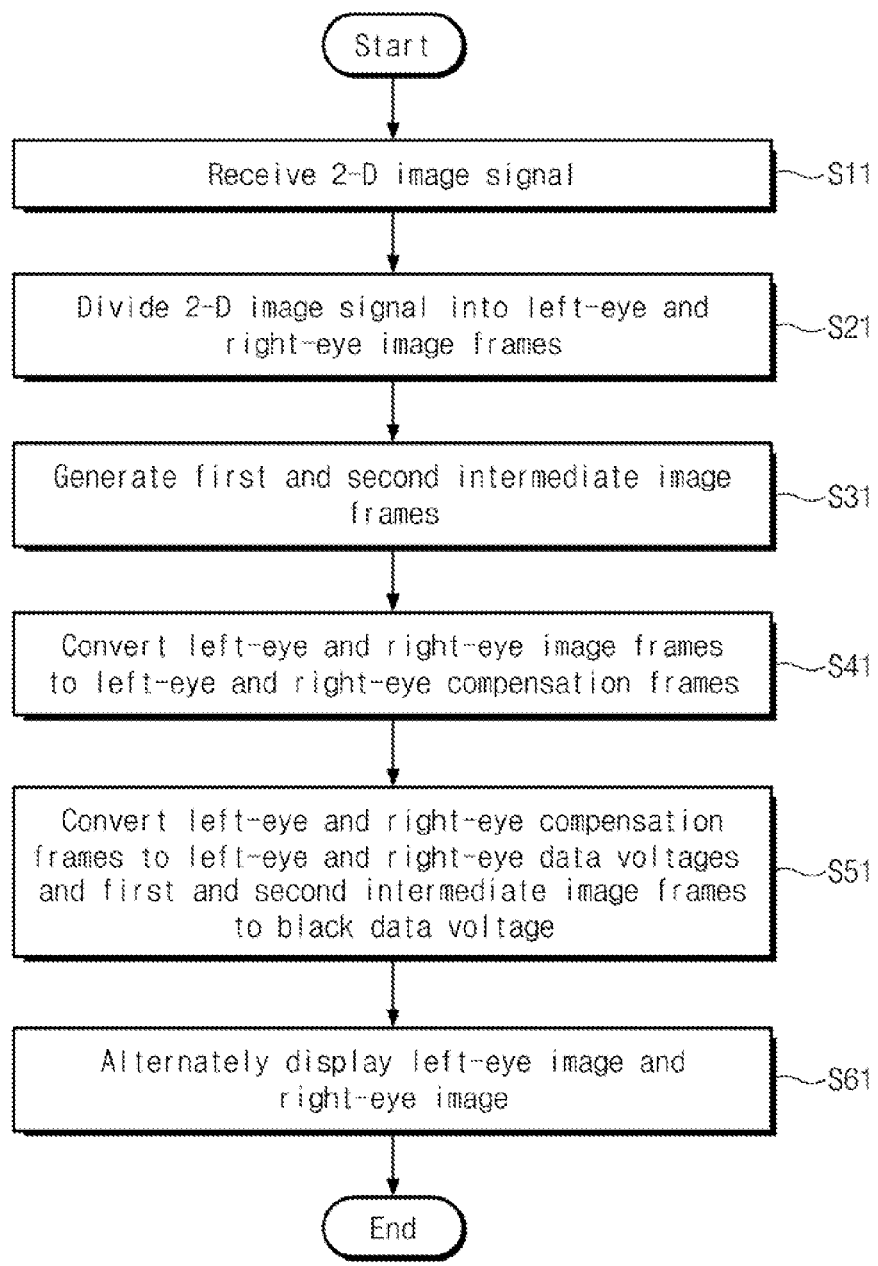
FIG. 10 is a flowchart showing a method of displaying a 3-D image on a display apparatus of FIG. 1.

FIG. 10 is a flowchart showing a method of displaying the 3-D image using the display apparatus of FIG. 1.

Referring to FIGS. 1 and 10, the frame rate converter 180 receives the 2-D image signal DATA from the external video system (S11).

The frame rate converter 180 divides the 2-D image signal DATA into a left-eye image frame L and a right-eye image frame R through the data divider 181 of FIG. 2 (S21).

The frame rate converter 180 receives the left-eye image frame L and the right-eye image frame R at the intermediate image insertion part 183, to generate the first intermediate image frame L and the second intermediate image frame R, which are successive to the left-eye image frame L and the right-eye image frame R, respectively (S31). The first intermediate image frame L may have the same value as the left-eye image frame L, and the second intermediate image frame R may have the same value as the right-eye image frame R.

The frame rate converter 180 provides the quad-speed image signal LLRR, including the left-eye image frame L, the first intermediate image frame L, the right-eye image frame R, and the second intermediate image frame R, to the timing controller 160.

The timing controller 160 compensates for the quad-speed image signal LLRR through the data compensation method above, to compensate for the charge rate of each pixel by outputting the quad-speed compensation image signal L'LR'R. Particularly, the timing controller 160 compensates for the left-eye image frame L by outputting the left-eye compensation frame L', and compensates for the right-eye image frame R by outputting the right-eye compensation frame R (S41). In addition, the timing controller 160 outputs the first and second intermediate image frames L and R without compensating for them. Thus, the timing controller 160 provides the quad-speed compensation image signal L'LR'R to the data driver 140.

The data driver 140 converts the left-eye compensation frame L to the left-eye data voltage, and the right-eye compensation frame R to the right-eye data voltage. In addition, the data driver 140 converts the first intermediate image frame L and the second intermediate image frame R to the predetermined black data voltage in response to the black insertion control signal BIC (S51).

According to the present exemplary embodiment, the data driver 140 inverts the polarity of each of the left-eye data voltage and the right-eye data voltage every 4n frames in response to the inversion signal.

Then, the data driver 140 sequentially provides the left-eye data voltage, the black data voltage, the right-eye data voltage, and the black data voltage to the display panel 100 (S61). The display panel 100 sequentially receives the left-eye data voltage, the black data voltage, the right-eye data voltage, and the black data voltage to display the 3-D image.

As described above, according to the method of displaying the 3-D image, first and second intermediate image frames, which are successive to the left-eye image frame and the right-eye image frame, respectively, are inserted and the first and second intermediate image frames are converted to a black data voltage, thereby preventing the left-eye image and the right-eye image from being mixed with each other.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A display apparatus comprising:
a frame rate converter configured to divide an image signal into a first image frame for a left eye and a second image frame for a right eye, and to generate a first intermediate image frame and a second intermediate image frame, which are successive to the first image frame and the second image frame respectively, so as to convert the image signal to a quad-speed image signal;
a timing controller configured to generate a first compensation frame and a second compensation frame from the first image frame and second image frame respectively, and to sequentially output the first compensation frame, the first intermediate image frame, the second compensation frame, and the second intermediate image frame;
a data driver configured to convert the first compensation frame and the second compensation frame to a left-eye data voltage and a right-eye data voltage, respectively, to convert the first and second intermediate image frames to a black data voltage corresponding to a predetermined black gray-scale in response to a black insertion control signal, and to invert a polarity of the left-eye data voltage and the right-eye data voltage every 4n frames (where n is a natural number equal to or larger than 1) in response to an inversion signal;
a display panel that sequentially receives the left-eye data voltage, the black data voltage, the right-eye data voltage, and the black data voltage to display a left-eye image and a right-eye image in an alternating manner; and a gamma voltage generator configured to provide a gamma reference voltage to the data driver, wherein the data driver converts the first compensation frame to the left-eye data voltage and the second compensation frame to the right-eye data voltage based on the gamma reference voltage.

2. The display apparatus of claim 1, wherein the left-eye data voltage and the right-eye data voltage have a same polarity with respect to a predetermined reference voltage.

3. The display apparatus of claim 2, wherein the black data voltage comprises a first black data voltage having a positive polarity with respect to a reference voltage and a second black data voltage having a negative polarity with respect to the reference voltage, and wherein the data driver converts each of the first and second intermediate image frames to either the first black data voltage or the second black data voltage according to the polarity of the left-eye data voltage and the right-eye data voltage.

4. The display apparatus of claim 1, wherein the first intermediate image frame has a same value as the first image frame, and the second intermediate image frame has a same value as the second image frame.

5. The display apparatus of claim 1, further comprising a frame memory configured to sequentially store frames of the quad-speed image signal, and wherein the timing controller is configured to compensate for a present image frame based on a previous image frame.

6. The display apparatus of claim 1, further comprising a 3-D timing converter configured to generate the black insertion control signal in response to a 3-D synchronization signal, and to provide the black insertion control signal to the data driver.

7. The display apparatus of claim 6, wherein the 3-D timing converter is further configured to generate an inversion selection signal to control a polarity inversion of the left-eye data voltage and the right-eye data voltage in response to the 3-D synchronization signal, and to provide the inversion selection signal to the timing controller, and wherein the timing controller is further configured to change a period of the inversion signal in response to the inversion selection signal.

8. The display apparatus of claim 7, wherein the inversion signal is inverted every four frames.

9. The display apparatus of claim 1, wherein the timing controller further comprises:
 a 3-D timing converter that generates the black insertion control signal in response to a 3-D synchronization signal, so as to provide the black insertion control signal to the data driver; and
 a frame memory configured to sequentially store frames included in the quad-speed image signal.

10. A display apparatus comprising:
 a timing controller that receives a first image frame for a left eye and a second image frame for a right eye in synchronization with a first control signal during a 3-D mode, and receives a 2-D image frame in synchronization with a second control signal during a 2-D mode;
 a data driver that, during the 3-D mode, converts the first image frame to a first data voltage and the second image frame to a second data voltage so as to alternately output the first and second data voltages, and that, during the 2-D mode, converts the 2-D image frame to a data voltage so as to output the data voltage; and
 a display panel that, during the 3-D mode, alternately receives the first data voltage and the second data voltage to alternately display a left-eye image and a right-eye image and that, during the 2-D mode, receives the data voltage to display a 2-D image,
 wherein the data driver converts the first and second image frames to a black data voltage corresponding to a predetermined black gray-scale in response to a black insertion control signal, so as to sequentially output the left-eye data voltage, the black data voltage, the right-eye data voltage, and the black data voltage,
 wherein during the 3-D mode, the data driver receives an inversion signal from the timing controller and inverts a polarity of the first and second data voltages and a polarity of the black data every 4n frames (where n is a natural number equal to or larger than 1) in response to the inversion signal, and during the 2-D mode, the data driver inverts the data voltage every n frames, and
 wherein during the 3-D mode a polarity of the black data voltage is the same as a polarity of the one of the left-eye data voltage and the right-eye data voltage that immediately precedes the black data voltage.

11. The display apparatus of claim 10, wherein the timing controller inverts the inversion signal every four frames in response to the first control signal, and inverts the inversion signal every frame in response to the second control signal.

12. The display apparatus of claim 11, wherein the left-eye data voltage and the right-eye data voltage have a same polarity with respect to a predetermined reference voltage.

13. The display apparatus of claim 10, wherein the black data voltage has either a positive polarity or a negative polarity with respect to a reference voltage, and the data driver is configured to determine a polarity of the black data voltage according to the polarity of the left-eye data voltage and the right-eye data voltage.

14. A method of driving a display apparatus, comprising:
 dividing an image signal into a first image frame for a left eye and a second image frame for a right eye;
 generating a first intermediate image frame and a second intermediate image frame, which are successive to the first image frame and the second image frame, respectively;
 converting the first image frame to a first compensation frame and the second image frame to a second compensation frame;
 providing a gamma reference voltage;
 converting the first compensation frame to a left-eye data voltage and the second compensation frame to a right-eye data voltage and, in response to a black insertion control signal based on the gamma reference voltage, converting the first and second intermediate image frames to a black data voltage corresponding to a predetermined black gray-scale based on the gamma reference voltage; and
 sequentially receiving the left-eye data voltage, the black data voltage, the right-eye data voltage, and the black data voltage, so as to alternately display a left-eye image and a right-eye image,
 wherein a polarity of the left-eye data voltage and a polarity of the right-eye data voltage are inverted every 4n frames (where n is a natural number equal to or larger than 1).

15. The method of claim 14, wherein the left-eye data voltage and the right-eye data voltage have a same polarity with respect to a predetermined reference voltage.

16. The method of claim 15, wherein the black data voltage has either a positive polarity or a negative polarity with respect to the reference voltage, and the polarity of the black data voltage is determined according to the polarity of the left-eye data voltage and the right-eye data voltage.

17. The method of claim 14, wherein the first intermediate image frame has a same value as the first image frame, and the second intermediate image frame has a same value as the second image frame.

* * * * *